No. 895,434.  
PATENTED AUG. 11, 1908.
G. L. COOPER.
VEHICLE SPEED SIGNAL.
APPLICATION FILED FEB. 20, 1908.
2 SHEETS—SHEET 1.
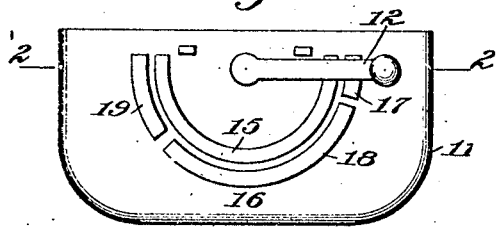
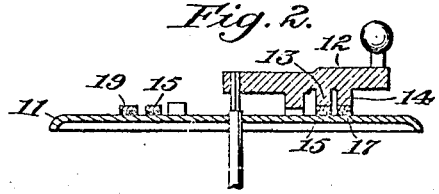
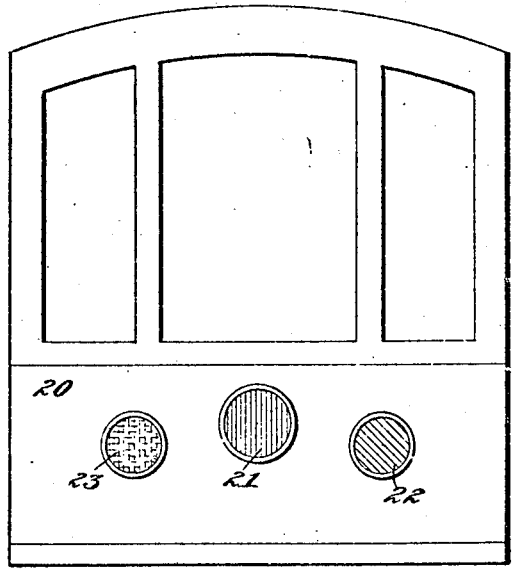
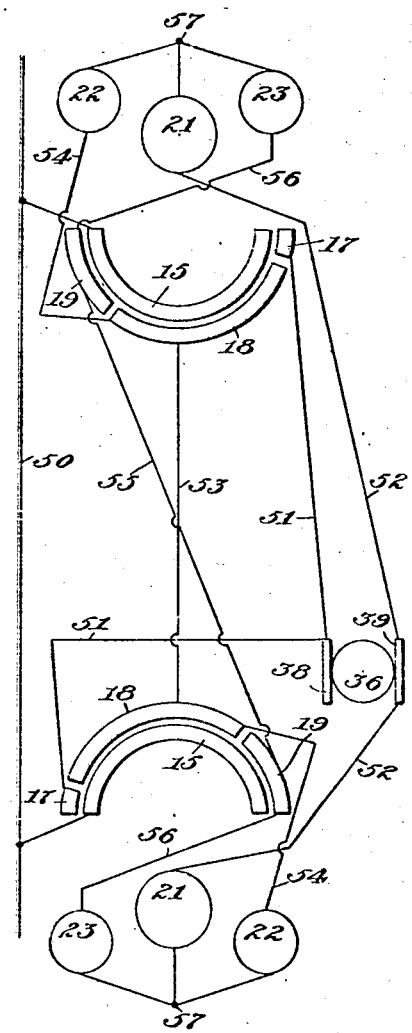
Witnesses:
Inventor:

No. 895,434. PATENTED AUG. 11, 1908.
G. L. COOPER.
VEHICLE SPEED SIGNAL.
APPLICATION FILED FEB. 20, 1908.
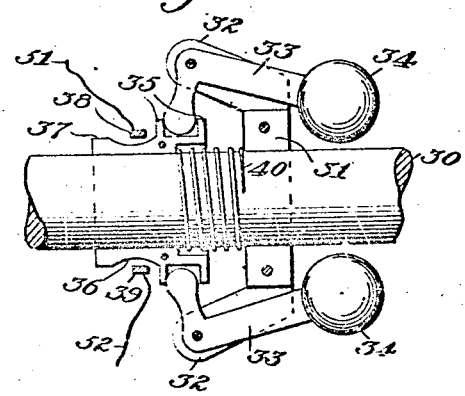
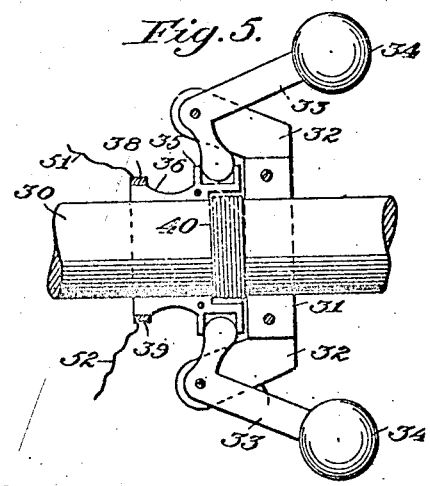
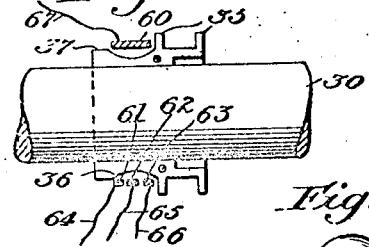
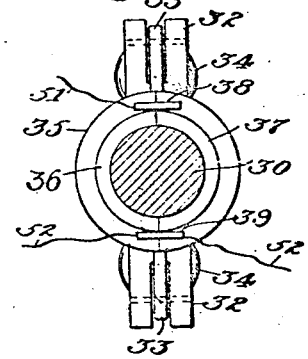
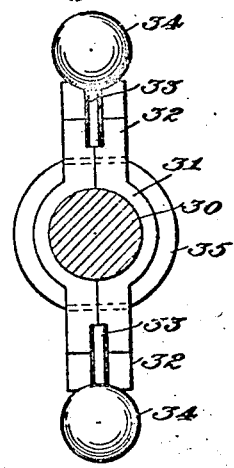

UNITED STATES PATENT OFFICE.

GEORGE L. COOPER, OF TROY, NEW YORK, ASSIGNOR OF THIRTY-FIVE ONE-HUNDREDTHS TO JOSEPH F. BUSH, OF SCHENECTADY, NEW YORK.

VEHICLE-SPEED SIGNAL.

No. 895,434.     Specification of Letters Patent.     Patented Aug. 11, 1908.

Application filed February 20, 1908. Serial No. 416,881.

*To all whom it may concern:*

Be it known that I, GEORGE L. COOPER, a citizen of the United States, and a resident of Troy, Rensselaer county, New York, have invented certain new and useful Improvements in Vehicle-Speed Signals, of which the following is a specification.

My invention relates to means for indicating, by a visual signal or one or more series of such signals, variations in the speed of a trolley car, train, motor car, or other vehicle. It also provides means for so indicating speed variations in a revolving shaft, whether in a stationary or moving apparatus. As it operates to indicate the actual rate of movement of a car or train, whether under power or carried forward by inertia or gravity, it may be advantageously used in connection with a certain car stop and speed signal, which forms the subject of an application for United States Patent filed Nov. 20th, 1907 by Jos. F. Bush, Serial No. 403,000. The Bush device is primarily designed to prevent collisions by indicating by visual signals, as electric lamps, variations in the power applied to move a car or train. But in practice such cars, notably trolley cars, are frequently run for considerable distances, as on down grades, without power. It is of course equally necessary for the motor-man of a following car to be able to distinguish between a car at rest and such a "floating" car, as if the car were moving under mechanical power. I will therefore first describe my device as adapted for coöperation with the Bush power signal, and afterward as an independent speed signal.

It will of course be understood that, while I have shown certain simple forms in which my invention may be embodied, it is capable of great variation in modes of construction in accordance with varied requirements and the skill of the engineer.

In the drawings, Figure 1 is a top plan view of a controller box of a trolley car; Fig. 2 is a vertical section through the plane 2—2, Fig. 1; Fig. 3 is a partial end view of the car; Figs. 4 and 5 are detached elevations of a portion of the device; Figs. 6 and 7 are respectively right and left end elevations of the same portion; Fig. 8 is a partial front elevation of the same portion in modified form; Fig. 9 is a greatly simplified diagram of the wiring.

Referring first to Figs. 1, 2 and 3 of the drawings, in which there is shown nothing that forms a part of this invention, 11 designates the top of a trolley car controller box and 12 the manual switch handle, which has two downwardly projecting lugs 13, 14 adapted to contact with two concentric segments 15, 16 of conducting metal, located on and insulated from the box 11. The outer segment 16 is divided into three contact plates, 17, 18 and 19. Mounted at each end of the car, and, as shown, on the dash 20, are three electric lamps 21, 22, 23, differing from each other in position, or preferably in value, as color or intensity. In the present instance, they are shown as provided with lenses or plates of red, green and yellow, see Fig. 3.

Figs. 4 to 7 of the drawings show a switch mechanism operated directly by the movement of the car or other vehicle, in contradistinction to operation by variations of the power applied to produce such movement. In the present instance, the switch is operated by variations in the speed of rotation of one of the axles of the car, and preferably an axle to which no brake power is applied, so as to obviate possible falsification of the signal by slipping or skidding. 30 designates a car axle, on which is securely bolted for rotation therewith a collar 31 having split arms 32 at its opposite sides, between which arms are pivoted bent levers 33, the free ends of which are provided with heavy balls 34. The other ends of the levers 33 pass between flanges 35 on a second collar 36, which is free as to longitudinal movement on the axle 30 and may or may not rotate therewith as preferred. I have shown this collar 36 as of circular cross-section, but this is obviously immaterial. It is formed with a shoulder 37 adapted to make and break contact between two brushes or bars 38, 39. A spring 40 normally holds the shoulder 37 out of operative contact with the bars, as shown in Fig. 4. For ease of application to a completed structure both collars 31, 36 are made in halves, to be bolted together as indicated.

In the wiring diagram, Fig. 9, 50 designates a current carrying wire, which may be a part of the lighting circuit and include suitable resistance, as inside lamps, too well known to require description. This wire 50 leads to a segment 15 at each end of the car.

Each segment plate 17 is connected by a wire 51 to one of the contact bars 38, shown in Figs. 4, 5 and 7. The other bar 39 connects by a wire 52 with a lamp 21 at each end of the car. The plates 18 are electrically connected by a wire 53 and each is connected by a wire 54 to one of the lamps 22. In the same way, the plates 19 are coupled by a wire 55 and each connects with a lamp 23 through a wire 56.

The operation of the device, in the particular form described, is as follows: It is understood that the lamps or other visual signals of the device in question are additional to the usual head and tail lamps, and the ordinary route lamps of the car. Hence the absence of all of them indicates to a motor-man of a following car or any other person that the car is stationary. In this case, the switch handle 12 stands in the position shown in Figs. 1 and 2 of the drawings. Also the centrifugal device, shown in Figs. 4 to 7, will stand as in Fig. 4, the contact between the bars 38, 39 being interrupted. To start the car, the motor-man must move the handle so as to contact the segment plates 15 and 18 at one end of the car. Current will then flow through the segment 15, both plates 18, these being connected, both wires 54 and both lamps 22 to earth or return line indicated at 57. The lamps 22 therefore indicate that the car is moving under less than full power. When the car is under full or nearly full power, the switch handle necessarily and automatically connects the plates 15 and 19. As these plates are connected by wire 55 and each connected by a wire 56 to a lamp 23, these lamps will then be caused to glow, indicating full speed. If now the motor-man cuts off power without braking up the car, the centrifugal balls 34 will remain in their moving position, shown in Fig. 5, so that the collar 36 connects the bars or brushes 38, 39. Current then flows through wire 50, segment 15, switch handle, plate 17, a wire 51, brush 38, collar 37, brush 39, both wires 52, both lamps 21 and to return line. This indicates that the car is "floating", i. e., moving without power.

While I have described the device so far as applied to a trolley car, and as employing electric lamps, I have no intention of limiting it either in function or structure, except as set forth in the claims. The trolley car is merely a vehicle in which my device would be particularly useful, and the electric lamp is a typical visual signal. Obviously also, the manual controlling portion, be it throttle-valve lever or switch handle, need not directly make and break the circuit. It is only necessary to the broadest view of my invention, that the signals be displayed, e. g., the lamps lighted and extinguished, automatically and through, by, or simultaneously with the manual operation. It is also clear that the wiring may be altered or parts omitted, to show signals at one end only of a car or train, or to show each set or series independently of the other from opposite ends of a car. So also in regard to the device for exhibiting the "no power" speed signal, which constitutes this part of my invention, it is obvious that, so long as it is dependent upon the mere motion of the car, in the present instance the rotation of an axle, it may be varied within wide limits from the centrifugal balls and sliding collar switch shown, at least in the broadest view of the invention.

Fig. 8 of the drawings represents a complete and independent speed signal, in no wise governed by the power applied. The axle 30 and the collar 36 are as already described. The metal bar 60 is of sufficient width to contact with the shoulder 37 through a considerable range of its travel, it being understood that the figure shows the device in its "car at rest" position, as in Fig. 4. The bars 61, 62, 63, properly supported as before in any desired manner, not shown, are arranged to contact successively with the shouldered portion of the collar 36 as the latter is moved to the right of the drawing by the gradually increasing divergence of the balls 34. By proper spacing of the bars 61, 62, 63, and correct adjustment of the resistance to movement of the collar 30, as by the springs 40, Figs. 4 and 5, lamps, as 21, 22, 23, to which the wires 64, 65, 66 respectively lead, may be lighted and extinguished at any given speed of the vehicle. Thus, if the device is applied to a motor car, the lamp 21 may be switched into circuit practically as soon as the car starts, the lamp 22 when the speed exceeds the legal speed permitted in cities and towns, say 10 miles per hour, and the lamp 23 when the authorized public road speed, say 20 miles, is exceeded.

It is of course understood that the wire 67, in the case of a gasolene or steam car, may lead from the bar 60 to a storage battery, not shown, instead of to a power line. It is also clear that any other form of visual signal may be substituted for the electric lamps indicated. The signal controlling device may be placed on either axle of the mobile, and the signals on either end of the car or on both, forming a simple and efficient detector of speed law violation. Obviously the number of lamps or other signals used is immaterial to my invention.

In the word "car", as used in the claims, I include any vehicle or train to which the device may be advantageously applied. The phrase "proper motion" includes any movement of a part in addition to its movement with the vehicle as a whole.

What I claim is:

1. In combination with means for starting a car, a visual signal carried on said car and automatically controlled by said starting means, and an additional automatic signal for indicating movement of the car when said starting means is in its inoperative position.

2. In combination with means for starting an electric car, a visual signal carried on said car and automatically controlled by said starting means, and an additional automatic signal for indicating movement of the car when said starting means is in its inoperative position.

3. In combination with means for starting an electric car, an electric signal lamp carried on said car and automatically controlled by said starting means, and an additional electric lamp automatically operated for indicating movement of the car when said starting means is in its inoperative position.

4. In combination with means for varying the power applied to a car, a plurality of visual signals for indicating such power variation carried on said car and automatically controlled by said power varying means, and an additional automatic signal for indicating movement of the car when said power varying means is in its inoperative position.

5. In combination with means for varying the power applied to a car, a plurality of visual signals for indicating such power variation carried on said car and automatically and successively operated by said power varying means, and an additional automatic signal for indicating movement of the car when said power varying means is in its inoperative position.

6. In combination with means for varying the power applied to a car, a plurality of visual signals of different values for indicating such power variation carried on said car and automatically controlled by said power varying means, and an additional automatic signal for indicating movement of the car when said power varying means is in its inoperative position.

7. In combination with means for varying the speed of a car, a plurality of visual signals for indicating such speed variation carried on said car and automatically controlled by said speed varying means, and an additional automatic signal for indicating movement of the car when said speed varying means is in its inoperative position.

8. In combination with means for varying the speed of a car, a plurality of visual signals for indicating such speed variation carried on said car and automatically and successively operated by said speed varying means, and an additional automatic signal for indicating movement of the car when said speed varying means is in its inoperative position.

9. In an electric car, a controller switch for varying the speed of the car, a plurality of electric signal lamps, means whereby said lamps are automatically operated by said switch as the speed is so varied, and an additional lamp for indicating movement of the car when said switch is in its inoperative position.

10. In an electric car, a controller switch for varying the speed of the car, a plurality of electric signal lamps, means whereby said lamps are automatically and successively operated by said switch as the speed is so varied, and an additional lamp for indicating movement of the car when said switch is in its inoperative position.

11. In combination with means for varying the speed of a car, a plurality of visual signals of different values for indicating such speed variation carried on said car and automatically controlled by said varying means, and an additional automatic signal of still different value for indicating movement of the car when said speed varying means is in its inoperative position.

12. In combination with means for varying the speed of a car, a plurality of visual signals of different values for indicating such speed variation and automatically and successively operated by said speed varying means, and an additional automatic signal for indicating movement of the car when said speed varying means is in its inoperative position.

13. In an electric car, a controller switch, a plurality of electric signal lamps, means whereby said lamps are automatically operated synchronously with the movement of said switch to various operative positions, an additional signal lamp, and means whereby said last named lamp is automatically operated by the movement of the car when said switch is in an inoperative position.

14. In an electric car, a controller switch, a plurality of electric signal lamps, means whereby said lamps are automatically and successively operated synchronously with the movement of said switch to various operative positions, an additional signal lamp, and means whereby said last named lamp is automatically operated by the movement of the car when said switch is in an inoperative position.

15. In an electric car, a controller switch, a plurality of electric signal lamps of different values, means whereby said lamps are automatically operated synchronously with the movement of said switch to various operative positions, an additional signal lamp of still different value, and means whereby said last named lamp is automatically operated by the movement of the car when said switch is in an inoperative position.

16. In an electric car, a controller switch, a plurality of electric signal lamps, means whereby said lamps are automatically operated synchronously with the movement of said switch to various operative positions, an additional signal lamp, and means whereby said last named lamp is automatically operated by the rotation of an axle when said switch is in an inoperative position.

17. In an electric car, a controller switch, a plurality of electric signal lamps, means whereby said lamps are automatically and successively operated synchronously with the movement of said switch to various operative positions, an additional signal lamp, and means whereby said last named lamp is automatically operated by rotation of an axle when said switch is in an inoperative position.

18. In an electric car, a controller switch, a plurality of electric signal lamps of different values, means whereby said lamps are automatically operated synchronously with the movement of said switch to various operative positions, an additional signal lamp of still different value, and means whereby said last named lamp is automatically operated by the rotation of an axle when said switch is in an inoperative position.

19. In a car, starting means, visual signals, one at each end of the car, means whereby both said signals are simultaneously and automatically controlled by said starting means, additional visual signals, one at each end of the car, and means whereby said last named signals are simultaneously and automatically controlled by the movement of the car when said starting means is in an inoperative position.

20. In a car, starting means, visual signals, one at each end of the car, means whereby both said signals are simultaneously and automatically controlled by said starting means, additional visual signals, one at each end of the car, and means whereby said last named signals are simultaneously and automatically controlled by the rotation of an axle when said starting means is in an inoperative position.

21. In a car, speed varying means, two series of visual signals, one at each end of the car, means whereby predetermined signals of each of said series are automatically and simultaneously operated by said speed varying means, additional visual signals, one at each end of the car, and means whereby said last named signals are automatically and simultaneously controlled by the movement of the car when said speed varying means is in an inoperative position.

22. In a car, speed varying means, two series of visual signals, one at each end of the car, means whereby predetermined signals of each of said series are automatically and simultaneously operated by said speed varying means, additional visual signals, one at each end of the car, and means whereby said last named signals are automatically and simultaneously controlled by the rotation of an axle when said speed varying means is in an inoperative position.

23. In an electric car, a controller switch, two series of electric signal lamps, one at each end of the car, means whereby predetermined lamps of each of said series are automatically and simultaneously controlled synchronously with the movement of said switch, additional signal lamps, one at each end of the car, and means whereby said last named lamps are automatically and simultaneously controlled by the rotation of an axle when said switch is in an inoperative position.

24. In a car, a visual signal, and means for exhibiting said signal, said means being operative only when the car is in motion without applied power.

25. In a car, starting means, a visual signal, and means for exhibiting said signal operative only when said starting means is in an inoperative position.

26. In a car, power varying means, a visual signal, and means for exhibiting said signal operative only when said power varying means is in an inoperative position.

27. In an electric car, an electric signal lamp, and means for switching said lamp into circuit operative only when the car is in motion without applied power.

28. In an electric car, starting means, an electric signal lamp, and automatically operated means for switching said lamp into circuit, said switching means being operative only when said starting means is in an inoperative position.

29. In an electric car, power varying means, an electric signal lamp, and automatically operated means for switching said lamp into circuit, said switching means being operative only when said power varying means is in an inoperative position.

30. In an electric car, a controller switch, a second switch operated by a rotating part, and an electric signal lamp controlled by both said switches so as to be operative only when said controller switch is in an inoperative position.

31. In an electric car, a manual switch, an automatic switch, an electric signal lamp, and an electric circuit including said lamp and both said switches said circuit being closable only when said manual switch is in its cut-out position.

32. In an electric car, a switch normally closed when the car is not under power, a second switch closed when the car is in motion, an electric signal lamp, and an electric circuit including said lamp and both said switches.

33. In a car, visual signals, one at each end of the car, and means for simultaneously exhibiting said signals operative only when the car is in motion without applied power.

34. In an electric car, electric signal lamps, one at each end of the car, and means for simultaneously switching said lamps into circuit operative only when the car is in motion without applied power.

35. In a car, manual power controlling means, visual signals, one at each end of the car, and automatically operated means for simultaneously exhibiting said signals, said exhibiting means being operative only when said power controlling means is in an inoperative position.

GEO. L. COOPER.

Witnesses:
A. FAIRWEATHER,
BESSIE M. TICEHURST.